(12) United States Patent
Daniels et al.

(10) Patent No.: US 7,148,500 B2
(45) Date of Patent: Dec. 12, 2006

(54) CASSETTE INTERFACE MODULE

(75) Inventors: Steven D. Daniels, Churchville, NY (US); Michael P. Urbon, Churchville, NY (US); James K. Butler, Sodus, NY (US); Giang T. Ngo, Hilton, NY (US); Patrick M. Bruton, Palmyra, NY (US); Michael Kenin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 182 days.

(21) Appl. No.: 10/756,928

(22) Filed: Jan. 14, 2004

(65) Prior Publication Data

US 2004/0178374 A1 Sep. 16, 2004

Related U.S. Application Data

(60) Provisional application No. 60/444,015, filed on Jan. 31, 2003.

(51) Int. Cl.
*G03B 42/08* (2006.01)
(52) U.S. Cl. ...................................................... 250/589

(58) Field of Classification Search ................. 250/589
See application file for complete search history.

(56) References Cited

U.S. PATENT DOCUMENTS 6,773,160 B1 * 8/2004 Evans et al. ................ 378/173

FOREIGN PATENT DOCUMENTS

JP             04042222 A    *  2/1992

* cited by examiner

*Primary Examiner*—Constnatine Hannaher
(74) *Attorney, Agent, or Firm*—Susan L. Parulski

(57) ABSTRACT

A cassette handling apparatus of a storage phosphor reader, which is used for reading a latent image stored in a storage phosphor contained in a cassette. The cassette handling apparatus includes: a cassette platen and front plate for receiving a cassette having a storage phosphor; a cassette centering guide mechanism for centering a received cassette on the cassette platen; a cassette feed mechanism for moving a received cassette into contact with the front plate; and a storage phosphor feed mechanism for feeding a storage phosphor out of a received cassette into the storage phosphor reader for processing.

13 Claims, 10 Drawing Sheets

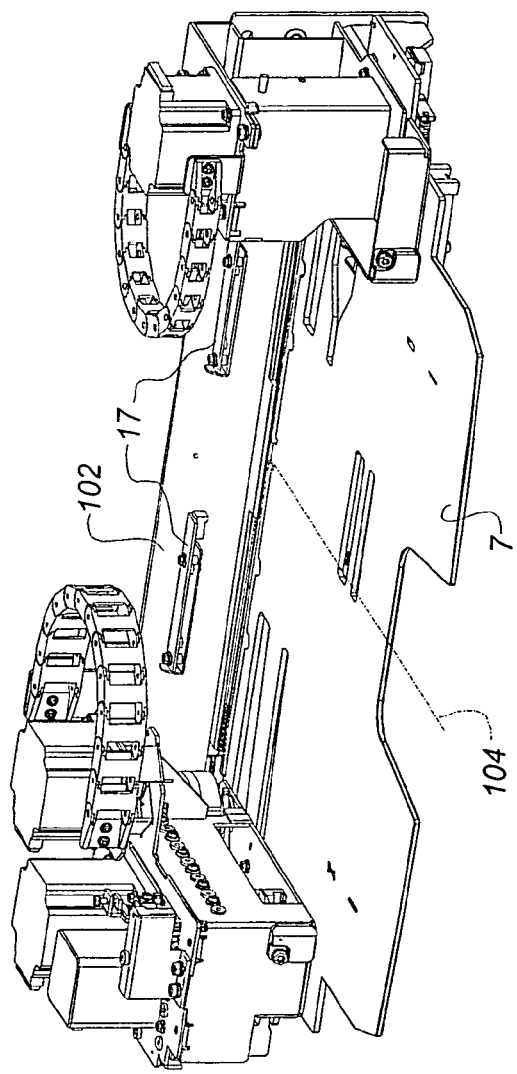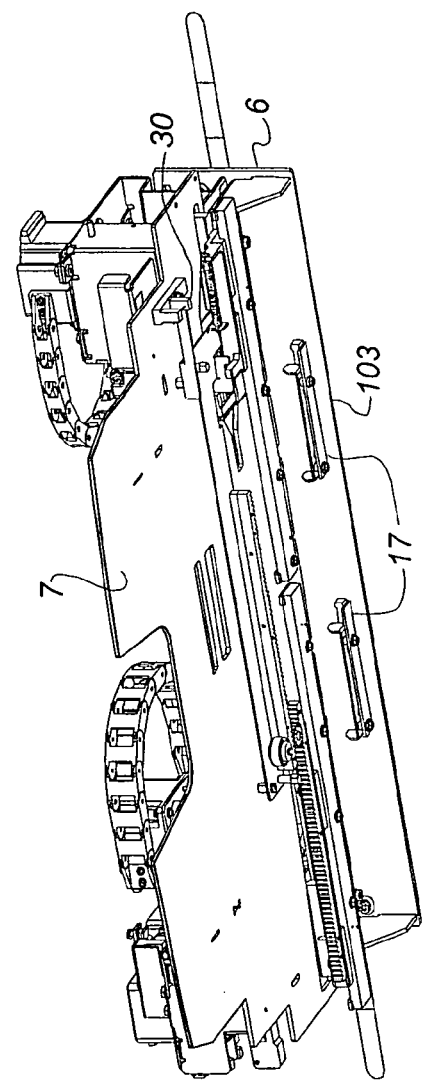

CASSETTE INTERFACE MODULE

CROSS REFERENCE TO RELATED APPLICATIONS

This is a 111A application of Provisional Application U.S. Ser. No. 60/444,015, filed Jan. 31, 2003.

FIELD OF THE INVENTION

This invention relates in general to computed radiography systems which process a storage phosphor disposed in a cassette, and more particularly to a cassette interface module for use in such systems.

BACKGROUND OF THE INVENTION

In conventional film-screen radiography, an object, such as a patient's body part, is exposed to x-rays projected through the object to the film-screen to produce a latent x-ray image of the object in the film. The film is then processed with chemicals or heat to produce a visual x-ray image for analysis by a medical practitioner. Computed radiography (CR) eliminates the necessity of developing film with chemicals or heat by producing a latent x-ray image in a storage phosphor which is subsequently scanned to produce a digital radiographic image that can be viewed on an electronic display. The storage phosphor can then be erased and reused.

Typically, the storage phosphor is contained in a light tight cassette. The cassette containing an exposed storage phosphor is presented to a storage phosphor reader (also referred to as a CR reader) where the exposed storage phosphor is removed from the cassette, scanned to produce a digital image, erased, and replaced in the cassette. It is desirable that the cassette interface of the CR reader be capable of handling different sized cassettes, accurately centering them, minimizing skew errors, and providing storage phosphor removal from and replacement in the cassette that is simple, automatic and accurate.

SUMMARY OF THE INVENTION

According to the present invention, there is provided a storage phosphor cassette interface that is adapted to address these needs.

According to a feature of the present invention, there is provided a storage phosphor reader for reading a latent image stored in a storage phosphor contained in a cassette, wherein the cassette handling apparatus comprises: a cassette platen and front plate for receiving a cassette having a storage phosphor; a cassette centering guide mechanism for centering a received cassette on said cassette platen; a cassette feed mechanism for moving a received cassette into contact with said front plate; and a storage phosphor feed mechanism for feeding a storage phosphor out of a received cassette into said storage phosphor reader for processing.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

ADVANTAGEOUS EFFECT OF THE INVENTION

The invention has several advantages. For example, different sized cassettes can be handled. In addition, the cassette can be accurately centered relative to the CR reader. Further, cassette skew errors are minimized. Still further, storage phosphor removal from and replacement in the cassette is simple, automatic and accurate.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIGS. 5 and 6 are, respectively, top and bottom perspective views showing cassette placement sensors.

DETAILED DESCRIPTION OF THE INVENTION

Figure 1:
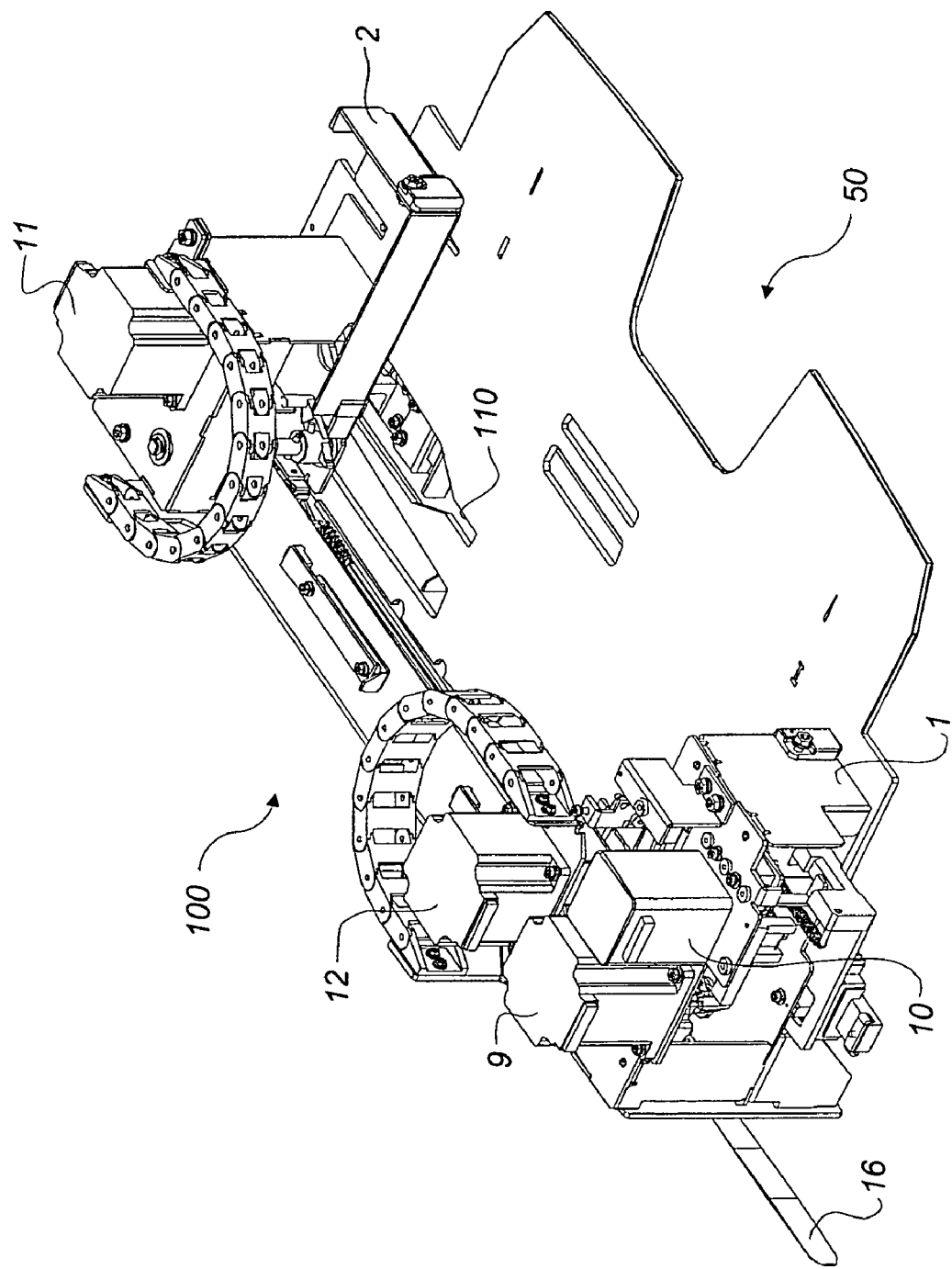
FIG. 1 is a top, front perspective view of an embodiment in accordance with the present invention.

The following is a detailed description of the preferred embodiments of the invention, reference being made to the drawings in which the same reference numerals identify the same elements of structure in each of the several figures.

The cassette interface module of the present invention is part of a storage phosphor reader (also referred to as a CR reader) which processes exposed storage phosphors contained in cassettes. The functions of the cassette interface module include (1) to extract a storage phosphor from a cassette presented to the storage phosphor reader and deliver the storage phosphor to the reader processing assemblies; and (2) to receive the storage phosphor from the storage phosphor reader and replace it back into the cassette.

Figure 2:
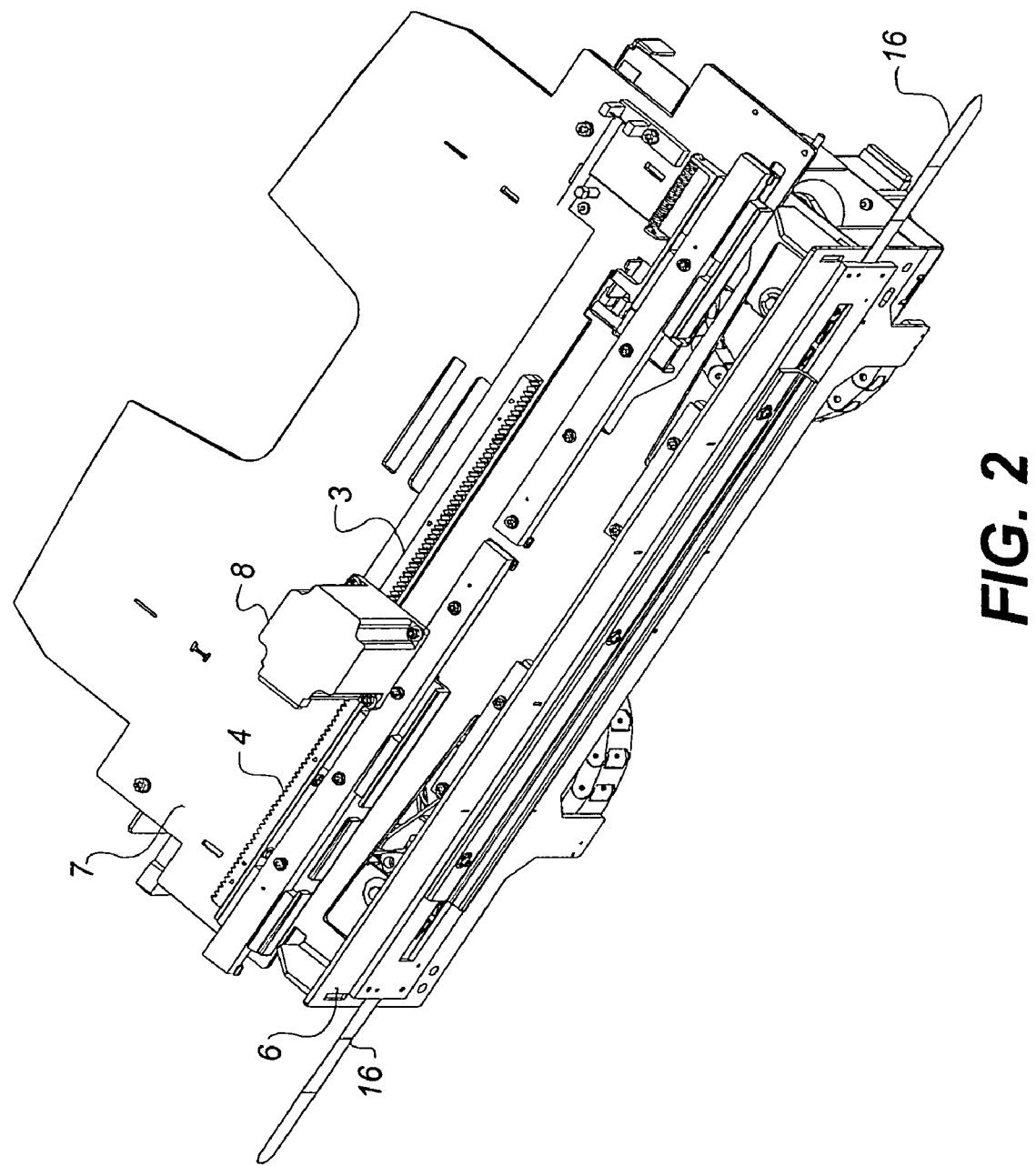
FIG. 2 is a bottom, rear perspective view of the embodiment of FIG. 1.
Figure 3:
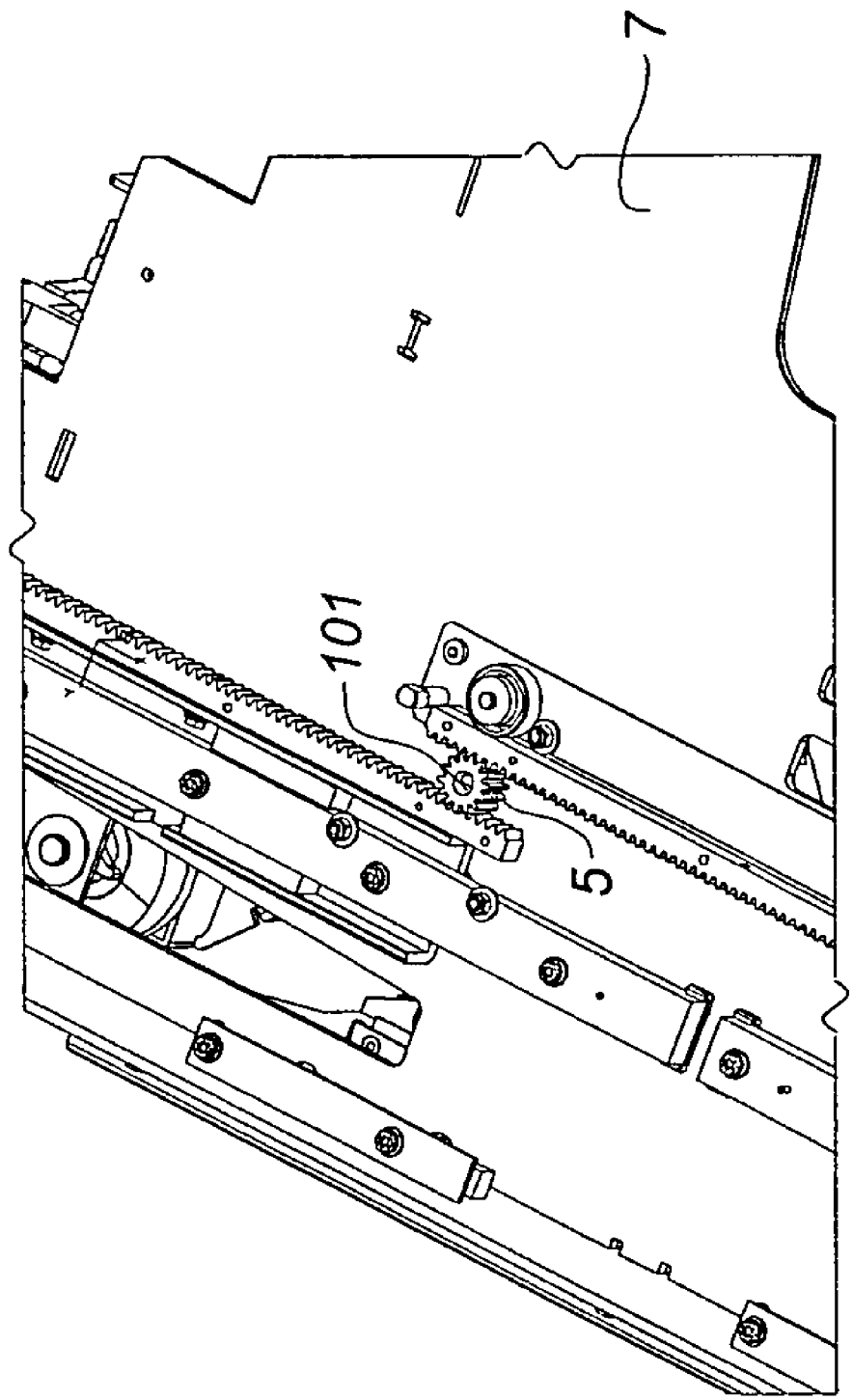
FIG. 3 is a partial bottom, perspective view of a component of the embodiment of FIG. 1 showing details of the cassette centering guide mechanism.
Figure 4:
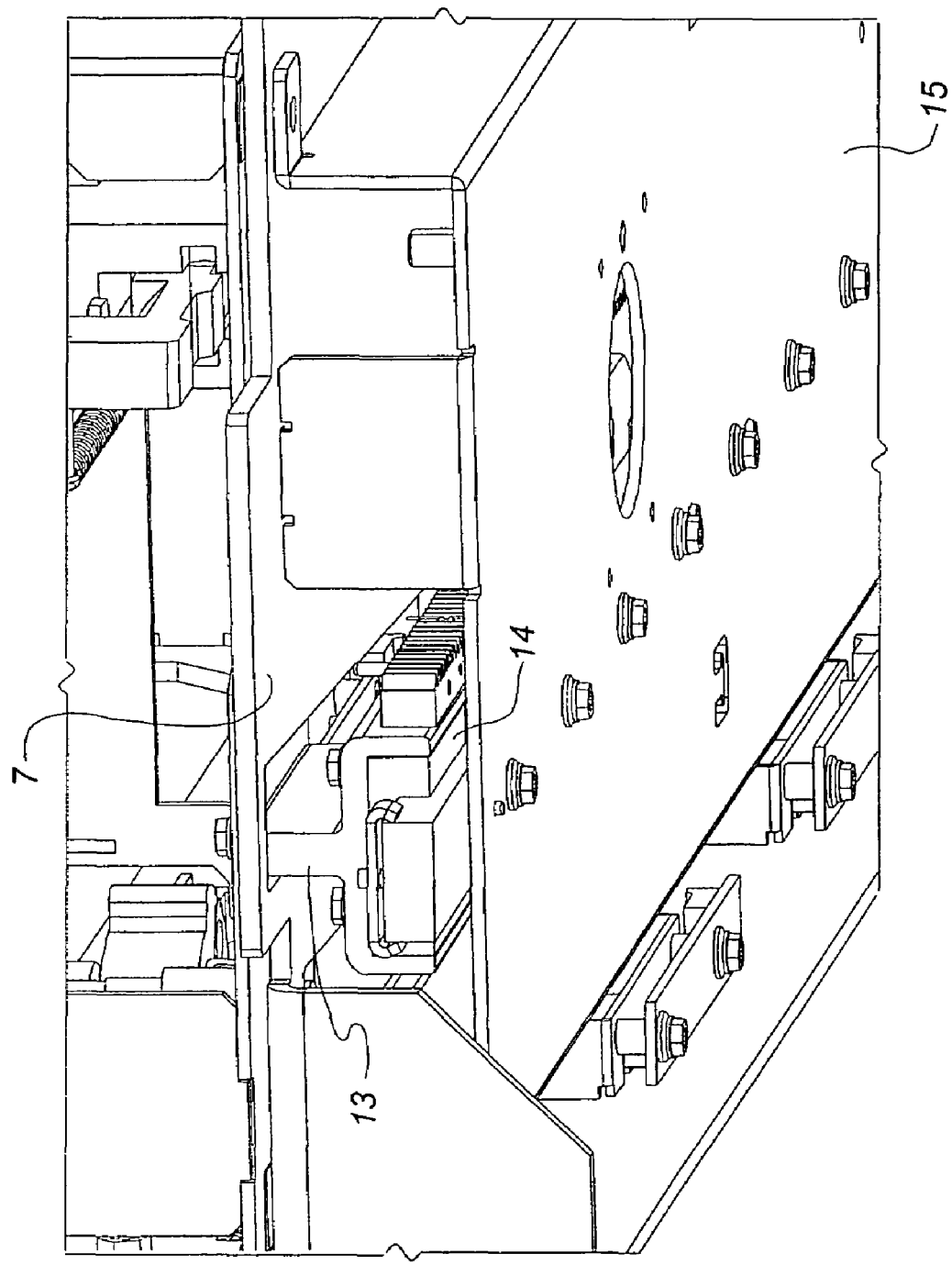
FIG. 4 is a partial bottom perspective view showing further details of the cassette centering guide mechanism.
Figure 7:
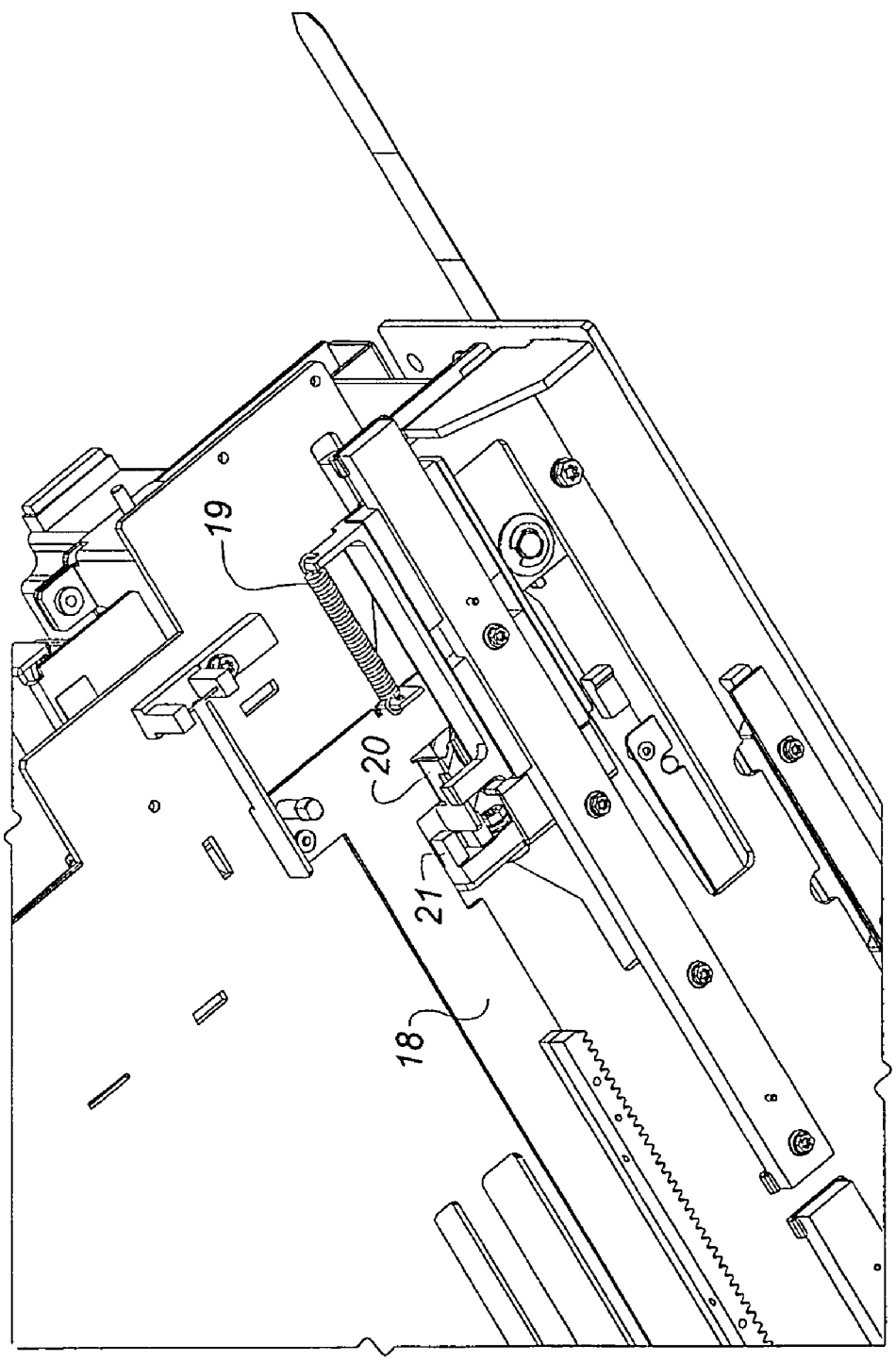
FIG. 7 is a partial bottom perspective view showing a centering overload sensor system.
Figure 8:
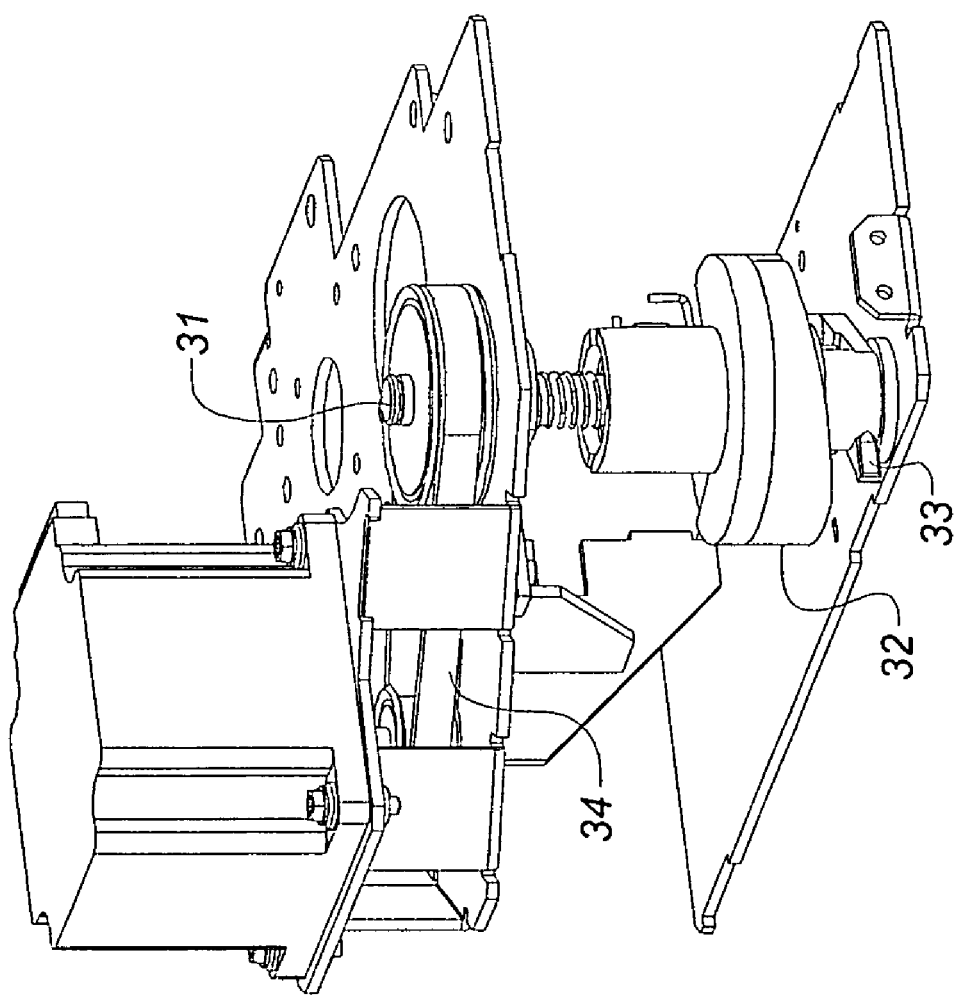
FIG. 8 is a partial top perspective view showing the cassette unlatching mechanism.
Figure 9:
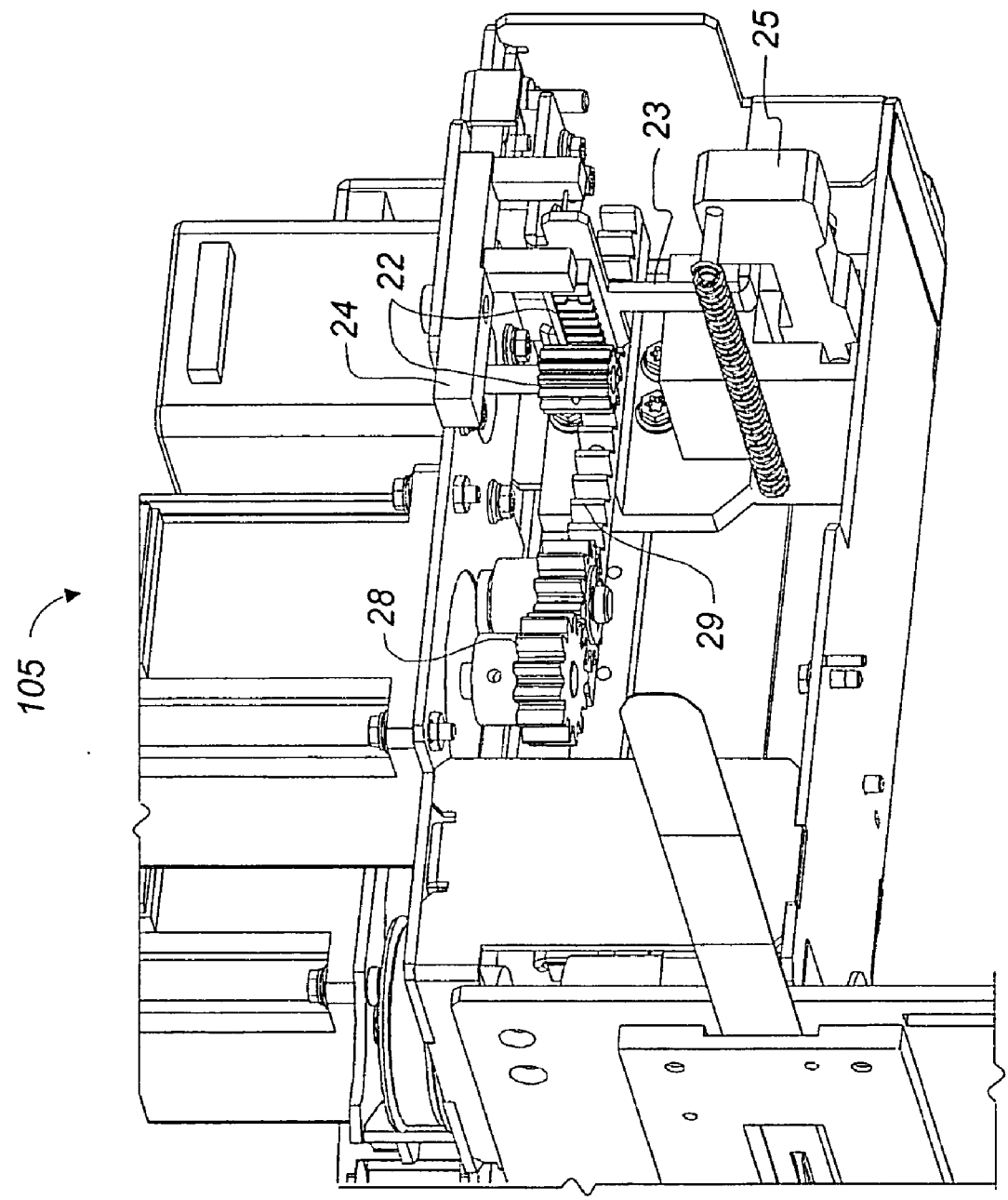
FIGS. 9–11 are partial perspective views showing the cassette carrier storage phosphor feed assembly.
Figure 10:
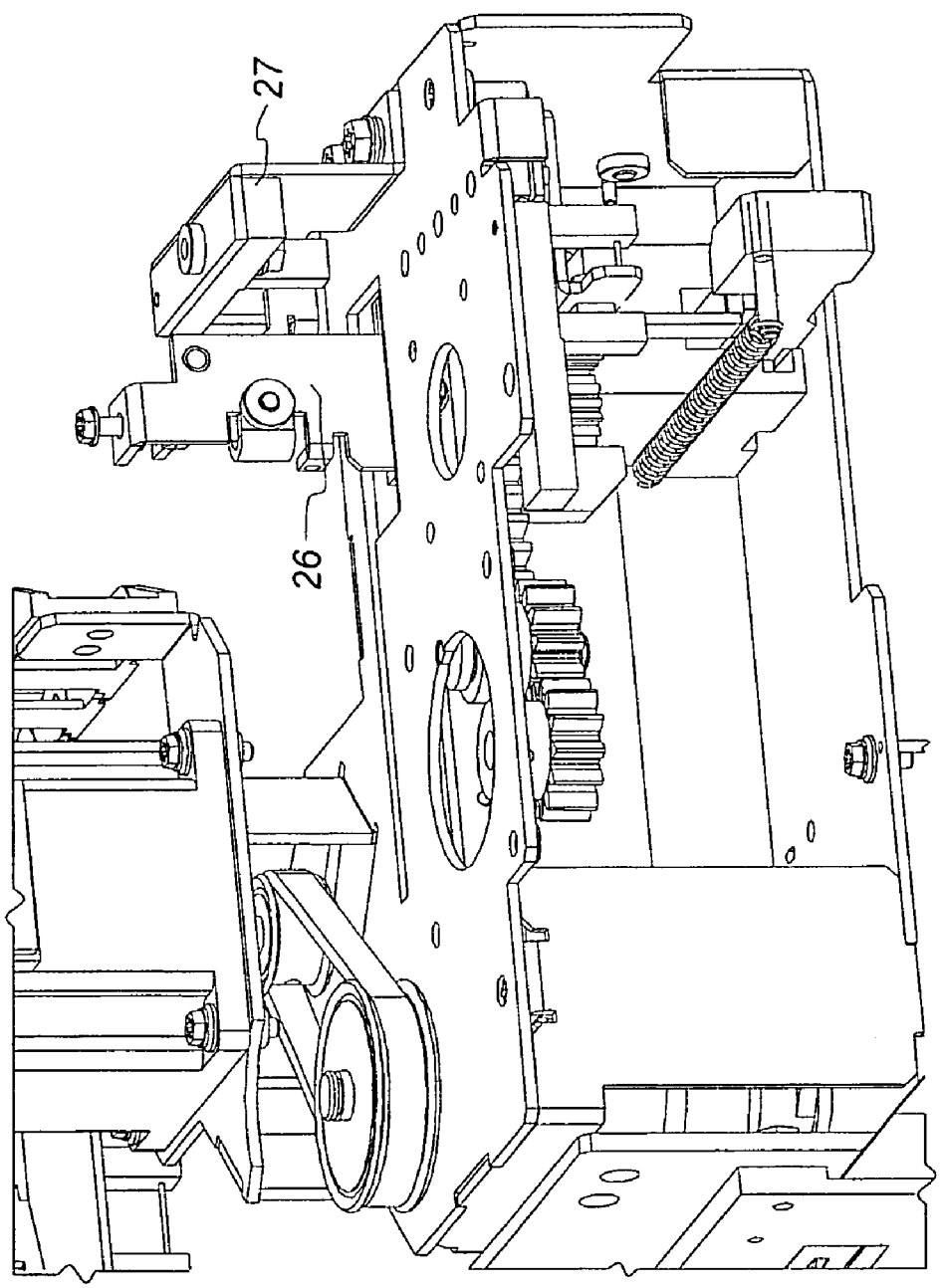
Figure 11:
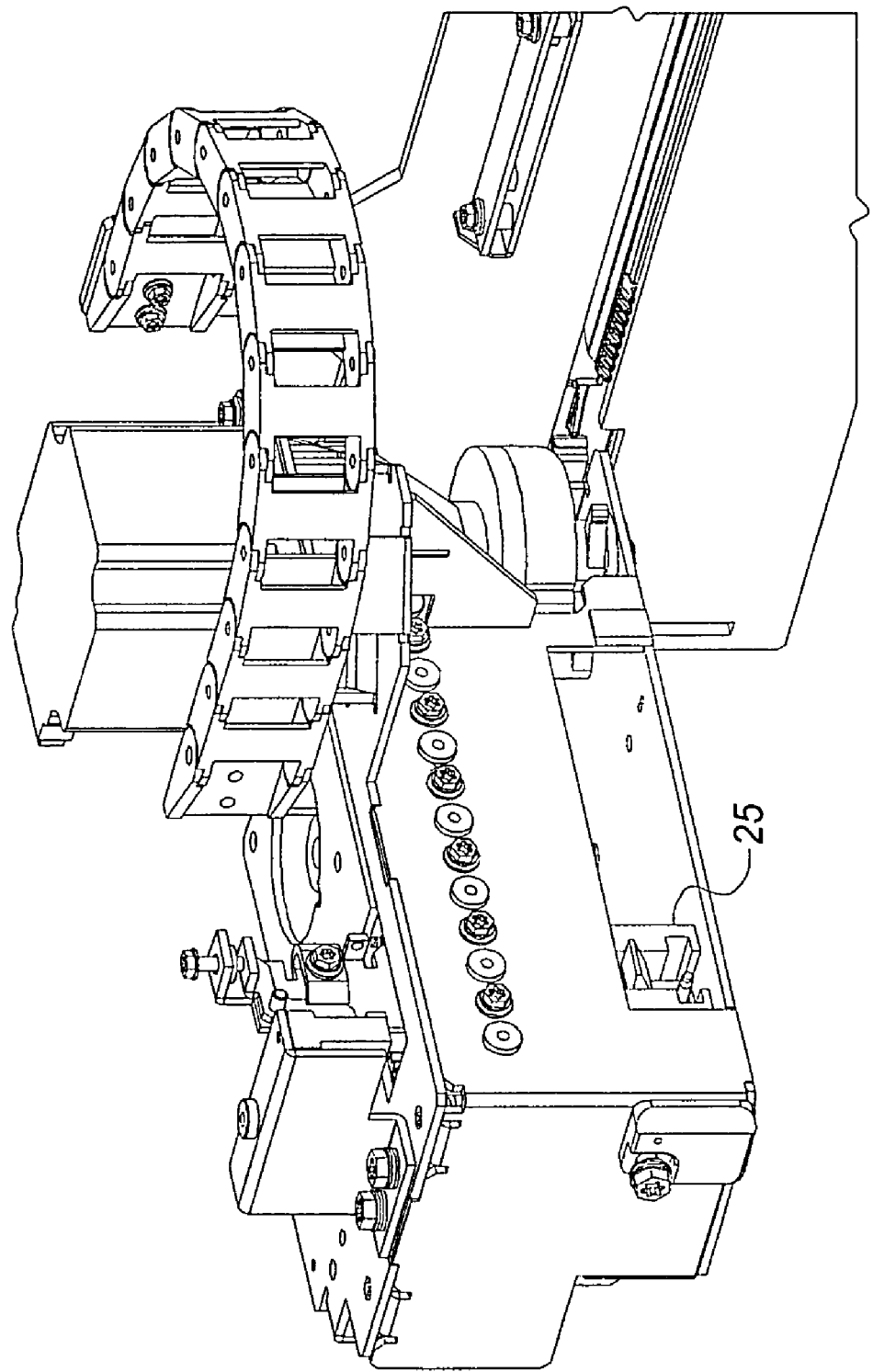

Referring now to FIGS. 1–11, there will be described an embodiment in accordance with the present invention.

A cassette interface module 50 includes left and right cassette guides 1 and 2, respectively, of a centering guide mechanism 100 with two gear racks 3, 4 actuated by a pinion 5 installed on a shaft 101 of guide motor 8. Guides 1 and 2 move the cassette for center registration, in-track alignment against a front plate 6, cassette capture, cassette door opening, storage phosphor removal, storage phosphor replacement and cassette door closure.

Cassette platen 7 and front plate 6 comprise a subassembly frame that is attached to the storage phosphor reader with screws and supported by brackets. Cassette platen 7 provides a support for a cassette when a user places a cassette onto it.

Module 50 includes five motors: (a) guide motor 8 drives the cassette centering guide mechanism 100 that aligns a cassette against moving cassette guides 1 and 2; (b) feed motor 9 drives a mechanism that drives the carrier inside the cassette to transport a storage phosphor out of and back in to the cassette; (c) pin retract motor 10 drives a feed pin retraction mechanism that protects the feed pin from cassette impact and premature cassette feed mechanism engagement; (d) cassette latch motor 11 on the right centering carriage drives a cam and pawl latch mechanism to align and secure a cassette against front plate 6; and (e) cassette latch motor 12 on the left centering carriage drives a cam and pawl latch mechanism to align and secure a cassette against front plate 6. Cassette guides 1 and 2 are mounted onto brackets 13 that are attached to rail ball slides 14. Slides 14 are mounted to the bottom of the drive box 15. Cassette platen 7 has openings 110 for brackets 13 to traverse platen 7.

Gear racks 3 and 4 are also attached to brackets 13. Racks 3 and 4 are in engagement with pinion 5 of the guide motor 8. Segments of a light tape 16 are captured in the light tape channel of the front plate 6 and attached to guides 1 and 2.

As best shown in FIGS. 5 and 6, four cassette placement sensors (two pair each) 17 are located on upper and lower front plate shelves 102, 103 in close proximity to front plate 6. Cassette platen 7 has four aperture openings to allow passage of sensor 17 light beams. Each pair of sensors 17 is placed symmetrically relative to cassette registration centerline 104. Preferably, the operator roughly centers the cassette in order to start the cycle.

When a symmetrical pair of placement sensors 17 are triggered by a cassette, an audible (or alternatively, visual) signal is given, which signifies that the machine cycle has begun. Guide motor 8 begins to drive cassette guide centering mechanism 100.

To promote the system's safety, right cassette guide 2 on the right side moving platform is lever 18 mounted and spring-loaded by spring 19. When a force exerted on the cassette from guide 2 exceeds a preloaded spring force of spring 19, overload sensor lever 18 with sensor flag 20 moves, and sensor flag 20 triggers sensor 21 and guide motor 8 stops.

A bar code reader (not shown) mounted underneath cassette platen 7 reads a bar code(s) on the cassette and is a sensing device for any unusual/unique cassette attitudes and cassette sizes, and for determining storage phosphor size and resolution.

After a cassette is secured between side guides 1 and 2, cassette latch motors 11 and 12 are actuated. Torque from motors 11 and 12 is translated through belt and pulley system 34 to cam and pawl shaft 31. Vertical cam 32 rotates and presses the cassette against the cassette platen 7. Rotating pawl 33 (that is roughly aligned with cassette side opening) comes through a cassette side opening and moves the cassette forward until the cassette is pressed against front plate 6. Maximum pawl drive force is restricted by a torsion spring installed between pawl 33 and shaft 31.

After the cassette is pressed against front plate 6 and captured with side guides 1 and 2, feed pin retract mechanism 105 (rack-pinion 22, bracket 23, sensor 24), mounted on left cassette guide 1 is actuated. This releases a spring-loaded feed pin 25 mounted on rail ball slide 14 attached to guide 1. The release allows engagement of feed pin 25 with feed and door lock features of the cassette. As such, feed pin 25 is disposed inside the cassette piston opening, pressing on door latch pawl and unlatching the cassette door, which opens.

To allow for the described sequence, a sensor actuator flag 26 is attached to actuator bracket 23. This flag travels through sensor 27 that is fixedly placed near pin retract motor 10.

Next, the storage phosphor feed mechanism is actuated. Feed motor 9 drives a pinion 28 (best shown in FIG. 9) and through a gear rack 29 (on the rack ball slide where rack 29 is attached to moving platform) drives a yoke with feed pin 25. From its home position, feed pin 25 translates the cassette carrier forward, and the storage phosphor is fed into the first pair of nip rollers of the reader.

When the storage phosphor is returned into the cassette, feed motor 9 drives the feed mechanism back. It drives the storage phosphor carrier and partially inserted storage phosphor inside the cassette. The feed mechanism is permitted to over-travel the home position of feed pin 25 to ensure latch engagement and cassette door closure. Feed pin 25 is retracted from the "over-traveled" position by pin retract mechanism 105; and the cassette is disengaged from feed pin 25. Feed motor 9 drives the mechanism back into the home position from the over-travel position. Cassette latch mechanism disengages from the cassette (pawl and cam rotate back into home position). Side guides 1 and 2 begin reverse movement to their home positions and then the mechanism stops. A home position sensor 30 (best shown in FIG. 6) mounted to cassette platen 9 senses end of movement of side guides 1, 2 (actuator flag is mounted to the right side drive rack). Thereafter, a user removes the cassette from platen 7.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 1 left cassette guide
2 right cassette guide
3 gear rack
4 gear rack
5 pinion
6 front plate
7 cassette platen
8 guide motor
9 feed motor
10 pin retract motor
11 cassette latch motor
12 cassette latch motor
13 brackets
14 cassette rail ball slides
15 drive box
16 light tape
17 cassette placement sensors
18 lever
19 spring
20 sensor flag
21 sensor
22 rack-pinion
23 bracket
24 sensor
25 spring loaded feed pin
26 flag
27 sensor
28 pinion
29 gear rack
30 home position sensor
31 cam and pawl shaft
32 vertical cam
33 pawl
34 belt and pulley system 50 cassette interface module
100 centering mechanism
101 shaft
102 upper shelf
103 lower shelf
104 cassette registration centerline
105 feed pin retract mechanism
110 openings

What is claimed is:

1. In a storage phosphor reader for reading a latent image stored in a storage phosphor contained in a cassette, a cassette handling apparatus comprising:
   a cassette platen and front plate for receiving a cassette having a storage phosphor;
   a cassette centering guide mechanism for centering a received cassette on said cassette platen, said cassette centering guide mechanism including left and right cassette guides and means for moving said guides into and out of centering when received on said cassette platen;
   a cassette feed mechanism for moving a received cassette into contact with said front plate, including a drive motor having a driven shaft and a pinion mounted on said driven shaft and left and right racks engaging said pinion and coupled respectively to said left and right cassette guides; and
   a storage phosphor feed mechanism for feeding a storage phosphor out of a received cassette into said storage phosphor reader for processing.

2. The cassette handling apparatus of claim 1 wherein said cassette centering guide mechanism includes means for preventing overloading of said force exerted by said guides against said cassette.

3. The cassette handling apparatus of claim 2 wherein said means for preventing includes an overload sensor assembly associated with at least one of said guides.

4. The cassette handling apparatus of claim 1 wherein said cassette includes a door which opens and closes and wherein said storage phosphor feed mechanism opens said cassette door before said storage phosphor is fed out of said cassette, and said storage phosphor feed mechanism slidably feeding a storage phosphor out of a received cassette in a direction parallel to the cassette platen into said storage phosphor reader for processing.

5. The cassette handling apparatus of claim 1, further comprising a sensor assembly for sensing receipt of a cassette on said platen and for consequently initiating actuation of said cassette centering guide mechanism.

6. The cassette handling apparatus of claim 1, wherein said cassette feed mechanism includes a vertically movable member which presses a received cassette against said platen.

7. In a storage phosphor reader for reading a latent image stored in a storage phosphor contained in a cassette, a cassette handling apparatus comprising:
   a cassette platen and front plate for receiving a cassette having a storage phosphor;
   a cassette centering guide mechanism for centering a received cassette on said cassette platen;
   a cassette feed mechanism for moving a received cassette into contact with said front plate;
   a storage phosphor feed mechanism for feeding a storage phosphor out of a received cassette into said storage phosphor reader for processing; and
   a sensor assembly for sensing receipt of a cassette on said platen and for consequently initiating actuation of said cassette centering guide mechanism.

8. The cassette handling apparatus of claim 7 wherein said sensor assembly comprises a pair of sensors adapted to detect rough centering for several sizes of cassette.

9. The cassette handling apparatus of claim 7 wherein said cassette feed mechanism includes left and right pawls that are adapted to mate with a received cassette to drive the cassette against said front plate.

10. The cassette handling apparatus of claim 7 wherein said cassette centering guide mechanism includes means for preventing overloading of said force exerted by said guides against said cassette.

11. The cassette handling apparatus of claim 10 wherein said means for preventing includes an overload sensor assembly associated with at least one of said guides.

12. In a storage phosphor reader for reading a latent image stored in a storage phosphor contained in a cassette, a cassette handling apparatus comprising:
   a cassette platen and front plate for receiving a cassette having a storage phosphor;
   a cassette centering guide mechanism for centering a received cassette on said cassette platen;
   a cassette feed mechanism for moving a received cassette into contact with said front plate; and
   a storage phosphor feed mechanism for feeding a storage phosphor out of a received cassette into said storage phosphor reader for processing,
   wherein said cassette feed mechanism includes a vertically movable member which presses a received cassette against said platen.

13. The cassette handling apparatus of claim 12, wherein the vertically movable member is a cam.

* * * * *